United States Patent
Barkstrom et al.

[15] 3,635,494
[45] Jan. 18, 1972

[54] DIAL HITCH LOCK FOR SWINGABLE TRAILER TONGUE

[72] Inventors: Reynold Barkstrom, Hinsdale; Peter J. Peacock, Western Springs, both of Ill.

[73] Assignee: International Harvester Company, Chicago, Ill.

[22] Filed: Feb. 5, 1970

[21] Appl. No.: 9,021

[52] U.S. Cl............................................280/462, 280/474
[51] Int. Cl..............................................................B60d 1/00
[58] Field of Search.................280/462, 467, 474; 292/166, 292/171

[56] References Cited

UNITED STATES PATENTS

| | | | |
|---|---|---|---|
| 1,435,373 | 11/1922 | Blain | 280/462 |
| 1,753,513 | 4/1930 | Hansen | 292/171 |
| 2,873,126 | 2/1959 | Van der Lely | 280/462 |
| 3,014,737 | 12/1961 | Claas | 280/462 |

FOREIGN PATENTS OR APPLICATIONS

| | | | |
|---|---|---|---|
| 489,163 | 7/1938 | Great Britain | 280/474 |

*Primary Examiner*—Leo Friaglia
*Attorney*—Floyd B. Harman

[57] ABSTRACT

A locking device for the tongue of a harvester which is pivoted at its rear end to a draft frame of the harvester for swinging movement about a vertical axis. The frame having an arcuate flange struck from the axis and overlying the tongue and having horizontal angularly spaced holes therein, a spring-loaded bolt on the tongue connected to an operating lever having a roller at one end engaging a bolt-mounting flange on the tongue to provide a fulcrum for the bolt. The lever is attached at its other end to a rope which leads to the operator's station for easy reach by the operator. The bolt is movable by the lever to withdraw from any of the openings in the flange and is spring urged into the opening selected after the operator has angled the tongue with respect to the harvester as desired.

6 Claims, 3 Drawing Figures

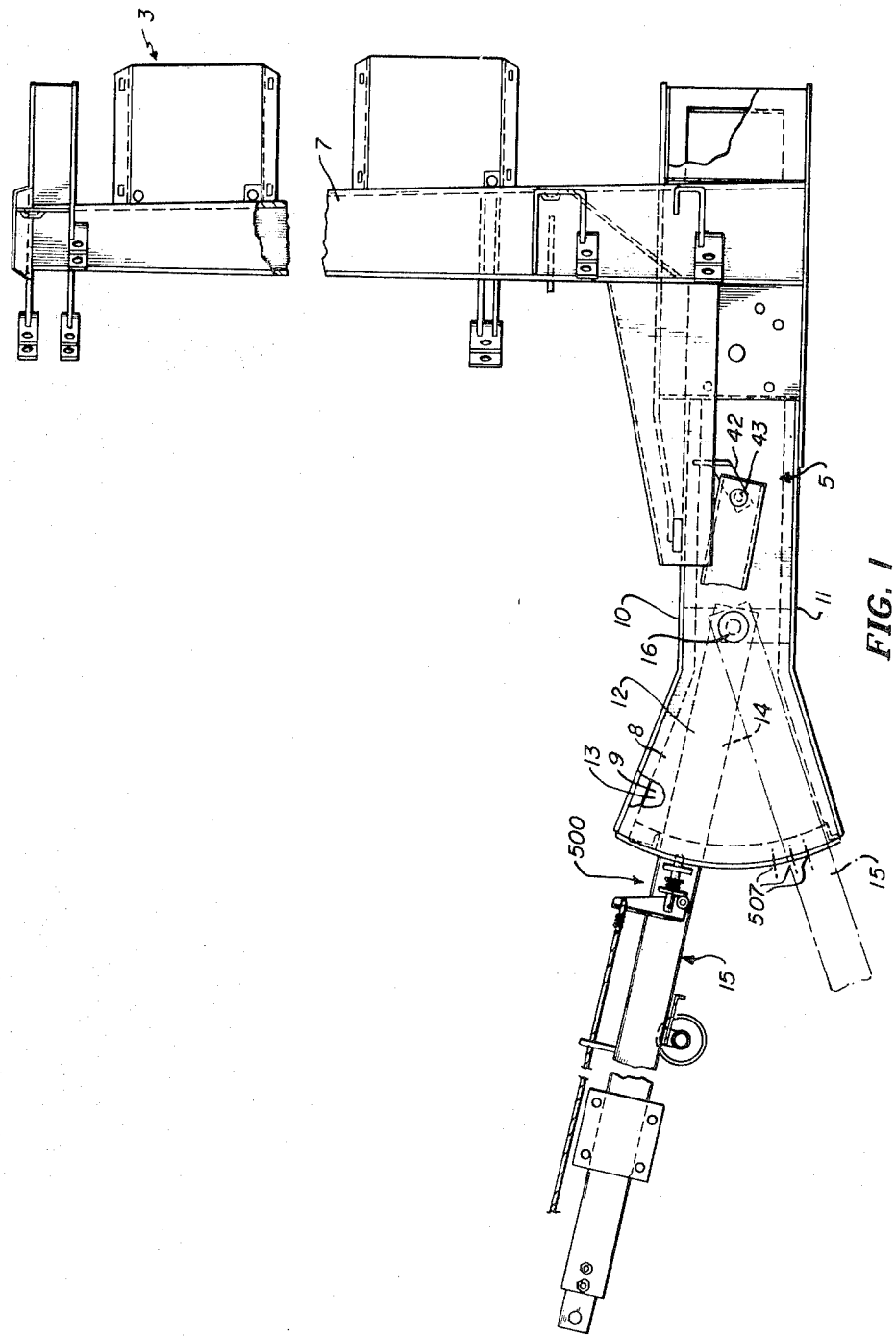

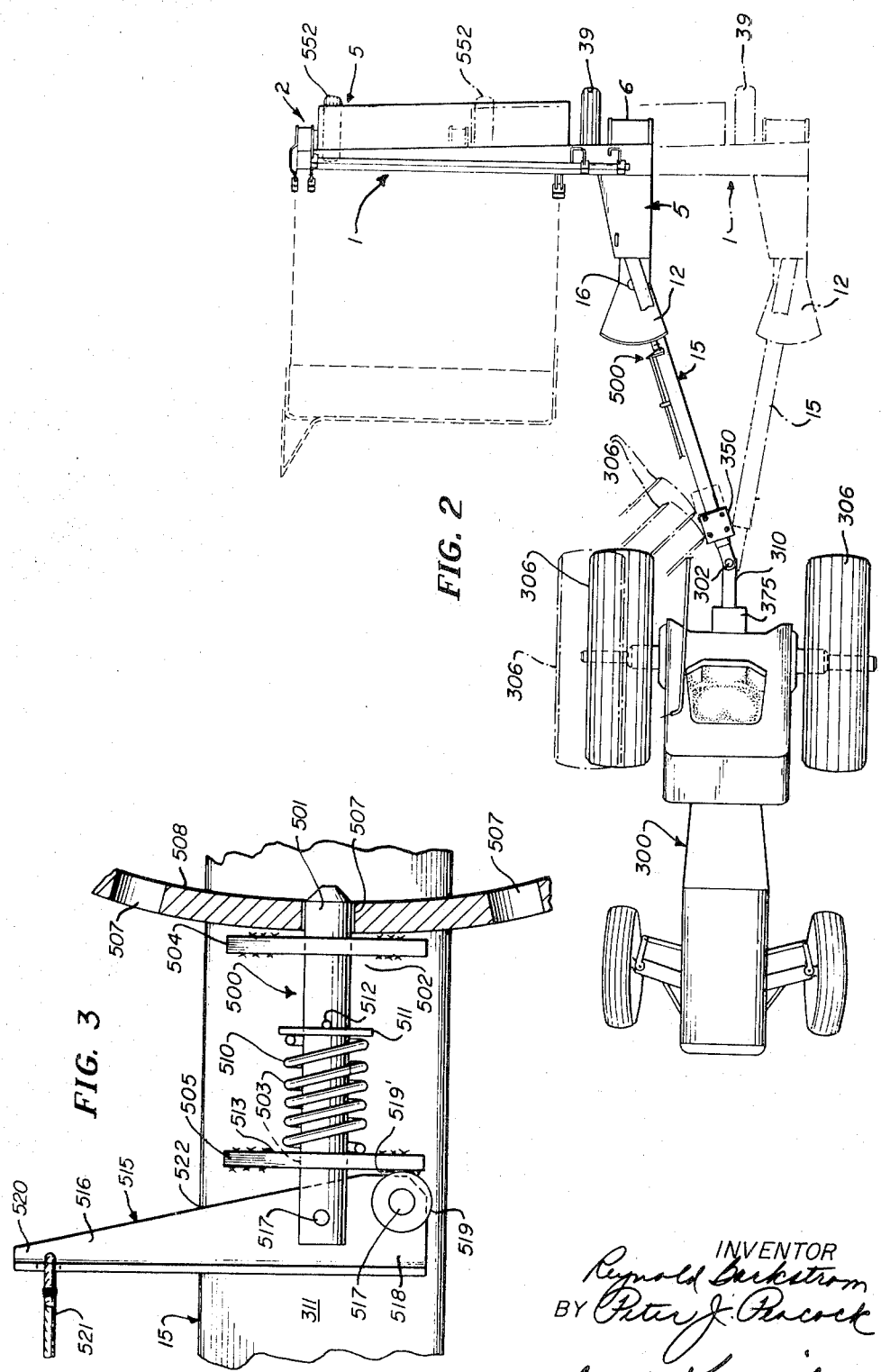

DIAL HITCH LOCK FOR SWINGABLE TRAILER TONGUE

BACKGROUND OF THE INVENTION

In dial hitch arrangements, problems in directly actuating a spring-loaded bolt have arisen where the tongue exerts a lateral load on the lock or the tongue hangs with respect to its pivot so that the bolt is tight in the openings into which it fits in the draft number of the harvester. Various lever arrangements have been tried, but these are either obstructive, complex or expensive or fail to operate easily and require the operator to step off the tractor and manipulate the parts into position by hand.

SUMMARY OF THE INVENTION

This invention is directed to a novel locking arrangement for a dial hitch of a harvesting machine.

A general object is to provide a bolt-type lock to which an operating lever is secured to provide adequate leverage and wherein the lever is arranged to pivot in a horizontal plane and thus accommodates mounting of the propeller shaft thereabove.

A more specific object is to provide a lock comprising a bolt slidably mounted through aligned holes in a pair of lugs fixed to the top of the tongue and having a locking end, the bolt being urged to locking position by a spring compressed between an abutment on the bolt and an opposing side of one of the lugs, the bolt having its other end pivotally connected to a lever intermediate its ends on a vertical axis, the lever being of L-section having one flange horizontally disposed and pivoted to the bolt as aforesaid, and mounting thereon a roller on a vertical axis, the roller engaging one of the lugs on a side opposite the spring and the other flange of the lever being vertical and having an opening therein for typing a rope thereto.

Another object is to arrange the lever with the locking bolt in such manner that in addition to the lever being adapted to be pulled horizontally, it is mounted on top of the bolt so that the lever may be manually swung vertically, that is up and down to rotate the bolt and thus free it from the mating opening in the draft frame.

These and other objects and advantages inherent in the invention will become more apparent from the specification and the drawings wherein:

FIG. 1 is a broken-apart top plan view of the frame structure incorporating the invention FIG. 2 is a plan view of the harvester with part of the structure shown in phantom lines and illustrating the connection of the unit to a tractor;

FIG. 3 is an enlarged fragmentary horizontal sectional view showing the latching mechanism for the tongue.

Having particular reference to the drawings there is shown a mover conditioner or harvesting machine generally designated 2 which comprises a framework generally designated 3 which comprises a fore and aft extending box section raft element 5 which at its rear end is integrally connected with an upstanding end frame structure 6 (FIGS. 1 and 2). The end frame structure 6 is connected at its upper end to a transverse tapered beam member 7. The members 5, 6, and 7 are disposed in $x$, $y$, and $z$ planes. The member 5 comprises top and bottom walls 8 and 9 and inboard and outboard walls 10 and 11. The forward end portion 12 of the draft member 5 is widened and flares forwardly to provide a pocket 13 for the rear end portion 14 of a tongue member 15. The rear end of the tongue member 15 is pivoted on a substantially vertical axis by means of a pin 16 which is connected to the top and bottom walls of the box section member 5.

Wheels 39 and 552 support the rear of the frame 3.

The position of the harvesting unit and the breakover bar and the divider in relation to the operating tractor generally designated 300 is shown in FIG. 2. The tractor is pivotally connected at 302 to the forward end of a tongue 15 as best seen in FIG. 1. A vertical pivot is established at 302 wherein lateral pivotal movement is obtained between the tongue and the tractor for steering purposes.

Referring now to FIGS. 2 and 3 particularly it will be observed that the unit 1 is positionable between an operating position laterally offset with respect to the tractor and a transport position wherein the unit is substantially tucked behind the tractor in order to reduce the overall width of the machine in a transport over the roads or through narrow gates. It will be noted particularly in FIG. 1 as well as in FIGS. 2 and 3 that the tongue member 15 swings about the axis 16 whereby the angular relationship between the harvesting unit and the tongue is changeable. The rear end of the tongue supports a bolt-locking assembly generally designated 500 which incorporates a bolt 501 slidably mounted in substantially horizontal apertures 502 and 503 in a pair of upstanding lugs 504 and 505 connected to the top wall 311 of the tongue 15. The bolt is spring loaded or biased to locking position for entry into any of the series of selected openings 507 in an arcuate wall 508 on the forward end of the draft structure 12. A spring 510 is sleeved over the bolt 501 and one end seats against the seat or washer 511 secured as by a pin 512 to the bolt 501 and at the other end the spring seats against the surface 513 of the lug 505. Thereby the spring continuously urges the bolt into locking position. An operating assembly 515 is provided for withdrawing and holding the bolt out of engagement with any of the apertures 507, said assembly comprising a laterally extending lever element 516 which intermediate its ends is pivoted on a substantially vertical axis as at 517 by means of a pin to the forward end of the bolt forwardly of the lug 505. The one end 518 of the lever has a roller 519 rotatably mounted thereon. The roller 519 is journaled about a vertical axis and has engagement with the forward side 519' of the lug 505. The opposite end 520 of the lever 516 is connected to the rear end of an operating member in the nature of a rope 521 which is adapted at its other or forward end to be secured close to the operator as to seat of the tractor for easy access by the operator. It will be observed that the rear edge 522 of the lever is cut diagonally in converging relationship to the forward side 519 of the upright lug 505 which insure that the lever does not bind against the front side of the lug in the extended position of the spring. The operator in wanting to swing the tongue 15 from the position shown in FIG. 10 in solid lines to the position shown in dotted lines would unlatch the tongue from the draft frame 12 by pulling on the cable or rope 512 to withdraw the pin 501 from the respective opening 507 and then while holding this cable taut he would turn and advance the tractor to the left as seen in FIG. 1 thereby positioning the tongue in the dotted-line position. The operator then would release the rope and the bolt would then enter into the adjacent pin opening 507. If the operator wished to change the position from that shown in dotted lines to any of the positions intermediate or to the position shown in solid lines in FIG. 1 he would again pull the rope and then would turn the tractor to the right until the thereby swinging the tongue 15 from the position shown in dotted lines to the position shown in solid lines. This same relationship is shown in FIG. 2.

Having described the novel harvesting unit various inventions are apparent and this application is concerned with inventions hereinafter claimed.

What is claimed is;

1. In a dial hitch for an implement comprising a fore and aft extending draft frame, a generally horizontal tongue having a rear end pivotally connected on a vertical axis to said draft frame, said draft frame having an arcuate element concentric with said axis with a plurality of angularly spaced transverse openings therein, a bolt extending longitudinally of the tongue in said position locating the bolt in alignment with respective openings in accordance with corresponding laterally displaced positions of the tongue, means biasing the bolt into respective openings, lever means pivotally connected on a vertical axis to the bolt, and means providing a fulcrum on the tongue affording a reaction point for the lever at one side of the bolt, said lever operable in a substantially horizontal plane and said lever being of L-section having horizontal and vertical legs, a roller rotatably mounted on said horizontal leg for engagement with the fulcrum, said vertical leg having means providing attachment for the lever to operating means therefor.

2. The invention according to claim 1 and said mounting means for the bolt comprising a pair of lugs on top of the tongue spaced lengthwise of the bolt and having aligned horizontal apertures receiving the bolt therethrough, and said lever positioned in front of the lug remote from said arcuate element and having a roller at one end engaging the adjacent side of the lug and extending outwardly of the tongue transversely thereof at the other end to provide a handhold for manual operation thereof.

3. The invention according to claim 2 and said horizontal leg having a diagonal edge opposing the adjacent flange to accommodate movement of the lever in a direction disengaging the roller from the flange to facilitate up-and-down movement of the lever to rotate the bolt.

4. The invention according to claim 3 and said flange adjacent to said lever having a flat vertical surface opposing said diagonal edge and defining a tool-admitting space therewith.

5. The invention according to claim 4 and said horizontal leg being flat and seating tangentially on the bolt.

6. The invention according to claim 4 and a spring sleeved on the bolt and between the flange adjacent the lever and an opposed abutment on the bolt.

* * * * *